United States Patent [19]

Pollak et al.

[11] Patent Number: 6,106,297
[45] Date of Patent: Aug. 22, 2000

[54] DISTRIBUTED INTERACTIVE SIMULATION EXERCISE MANAGER SYSTEM AND METHOD

[75] Inventors: Eyton Pollak, Oviedo; Sandra Vaquerizo, Port Orange, both of Fla.

[73] Assignee: Lockheed Martin Corporation, Orlando, Fla.

[21] Appl. No.: 08/745,451

[22] Filed: Nov. 12, 1996

[51] Int. Cl.[7] ............................................. F41G 3/26
[52] U.S. Cl. ............................. 434/16; 434/11; 434/23
[58] Field of Search ............................... 434/11, 69, 62, 434/29, 16, 23; 273/442, 440; 463/1, 40, 42, 43

[56] References Cited

U.S. PATENT DOCUMENTS

| | | | |
|---|---|---|---|
| 3,078,093 | 2/1963 | Hotkins | 273/445 |
| 4,057,913 | 11/1977 | Eisenberg . | |
| 4,176,468 | 12/1979 | Marty, Jr. . | |
| 4,424,038 | 1/1984 | Tingleff et al. . | |
| 4,641,255 | 2/1987 | Hohmann | 364/522 |
| 4,760,388 | 7/1988 | Tatsumi et al. | 340/717 |
| 4,820,161 | 4/1989 | Wescott . | |
| 4,959,015 | 9/1990 | Rasinski et al. . | |
| 5,184,956 | 2/1993 | Langlais et al. | 434/69 |
| 5,213,503 | 5/1993 | Marshall et al. . | |
| 5,224,861 | 7/1993 | Glass et al. . | |
| 5,275,565 | 1/1994 | Moncrief | 434/29 |
| 5,299,810 | 4/1994 | Pierce et al. | 273/434 |
| 5,498,003 | 3/1996 | Gechter | 273/434 |
| 5,623,642 | 4/1997 | Katz et al. | 395/500 |
| 5,660,547 | 8/1997 | Copperman | 434/29 |

OTHER PUBLICATIONS

"Enumeration and Bit–encoded Values for use with IEEE 1278.1–1994, Distributed Interactive Sumulation—Application Protocols", Institute For Simulation and Training. (pp. 1–315), published Mar., 1994.

"A Web–Based Approach To After Action Review", T. Keliher et al., General Corporate Research & Development (8 pages), presented at the 1996 IMAGE Conference, Scottsdale, Arizona, Jun. 23–28, 1996.

Golner et al, "The Application of Network Time Protocol (NTP) To Implementing DIS Absolute Timestamp", 11th DIS, Sep. 26–30, 1994, pp. 431–440.

Mayes et al., "A Prototype DIS Environment Manager", 11th DIS Sep. 26–30, 1994, pp. 563–568.

Tackaberry et al, "A Prototype DIS Scene Manager", 11th DIS, Sep. 26–30, 1994, pp. 389–401.

Standard for Distributed Interaction Simulation—Application Protocols, Version 2.0 Fourth Draft, University of Central Florida, Division of Sponsored Research, Feb. 4, 1994.

Pollak et al, "Interoperability Of Dissimilar Visual Systems By Scene Management", Presented at the 1996 IMAGE Conference, Scottsdale, Arizona, Jun. 23–28, 1996.

*Primary Examiner*—Joe H. Cheng
*Attorney, Agent, or Firm*—Rockey, Milnamow & Katz, Ltd.

[57] ABSTRACT

A manager system provides a set of integrated tools designed to assist in all stages of the military engagement training cycle: exercise creation, monitoring, and review. All information created or gathered at each stage is automatically made available to the next training stage. It can be distributed on the World–Wide Web, or can be viewed using a Web browser. The manager system uses the protocols established by the Distributed Interactive Simulation Standard (DIS) to both send and receive information from other DIS applications in order to perform each training stage. This allows the manager system to simultaneously monitor multiple dissimilar DIS training simulators during a joint exercise.

36 Claims, 17 Drawing Sheets

FIG. 4

BEFORE
EXERCISE GENERATION & PREVIEW — 32

Vertex Properties
Move   Velocity: 45
Fire
Scan

- DESIGNATION OF VEHICLE PATHS
- ATTRIBUTION OF VEHICLE BEHAVIOR
- ANIMATED PREVIEW OF EXERCISE
- GENERATION OF DIS PDU'S
- GENERATION OF SAFOR SCRIPTS

DURING
EXERCISE MONITORING (PLAN VIEW DISPLAY) — 34

11:45:34   123/212   345 PDU/sec

Entity Status
ID        Rounds Fired
State     %Hit
Ammo
Fuel

- LIVE DISPLAY OF ENTITY POSITIONS
- ANIMATED EXERCISE EFFECTS
- VOICE PLAYBACK
- ENTITY AND EXERCISE STATUS DISPLAY
- 3D VIEWPOINT (STEALTH) CONTROL

AFTER
AFTER ACTION REVIEW — 36

11:24:05   143/343   46%

Exercise Statistices
Fire Statistics   Rounds Fired
US Casualties    PDUs/sec
OPFOR Casualties

- REPLAY OF EXERCISE (FF, REW, STOP)
- COMPARISON WITH PLAN
- INTERACTIVE ANALYSES
- EXERCISE SCORING
- GENERATION OF REVIEW MATERIALS

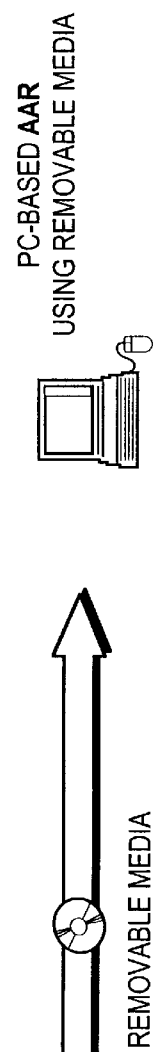

DIS LAN/ — DIS CONNECTED EXERCISE MANAGER SYSTEM AUTOMATED AAR

REMOVABLE MEDIA

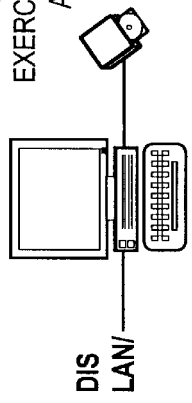

PC-BASED AAR USING REMOVABLE MEDIA

FIG. 5

APPLICATION EXECUTIVE: EXERCISE MANAGER (20)

PLAN (20a)
- SCENARIO GEN.
- TAC GRAPHICS
- PLAN ANIMATION

CONTROL (20b)
- INITIALIZATION
- REAL-TIME CONTROL
- 3D VIEWPOINT SELECT

MONITOR (20c)
- STATISTICS COLLECTION
- EVENT TAGGING
- WEATHER MONITORING

REVIEW (20d)
- PLAYBACK EXERCISE
- SCALED TIME, PAUSE
- CRITICAL EVENT INDEX

CREATE AAR (20e)
- TEMPLATE SELECTION
- FORMAT:
  TEXT & CHARTS: HTML
  GRAPHS: GIF
  MOVIES: MPEG
- EXPORT PACKAGE
- INVOKE HTML BROWSER (NETSCAPE)

APPLICATION INTERFACE LAYER

DIS ENTITY MANAGER (20-2)
- DEAD RECKONING / SMOOTHING
- TIME CORRECTION
- COORDINATE CONVERSION
- RANGE AND PRIORITY FILTERING

2D VIEWER (MAP DISPLAY) (20-1)
- TERRAIN CONTOURS, CULTURE, IMAGERY
- 2D VEHICLE ICON OVERLAY, ARTICULATION
- FIRE, DETONATION, COLLISION ANIMATION
- ZOOM / PAN ANY SCALE
- 2D VIEWPOINT CONTROL
- PICTURE AND MOVIE CAPTURE

HTML BROWSER (NETSCAPE)
- GRAPH/CHART BROWSING
- MOVIE ANIMATION

PLATFORM: ANY UNIX/ PC/MAC

DIS LOGGER
- PDU RECORD
- PDU PLAYBACK
- SCALED TIME
- PAUSE/ADVANCE

PLATFORM: SUN/DEC/ PC

DIS PROTOCAL INTERFACE | NTP | USER INTERCE TOOLKIT, ICONS

NETWORK INTERFACE TCP/IP UDP/IP | XWINDOW/XLIB MOTIF | XGL/EXGL OPENGL

POSIX COMPLIANT SYS5 UNIX

PLATFORM HARDWARE : SUN SPARC STATION OR DEC APLHA

| GX/GS/GT/ZX | CDDI | FDDI | SCSI | RS-232 | ETHERNET | CORE SERVICES | ETHERNET |

FIG. 10

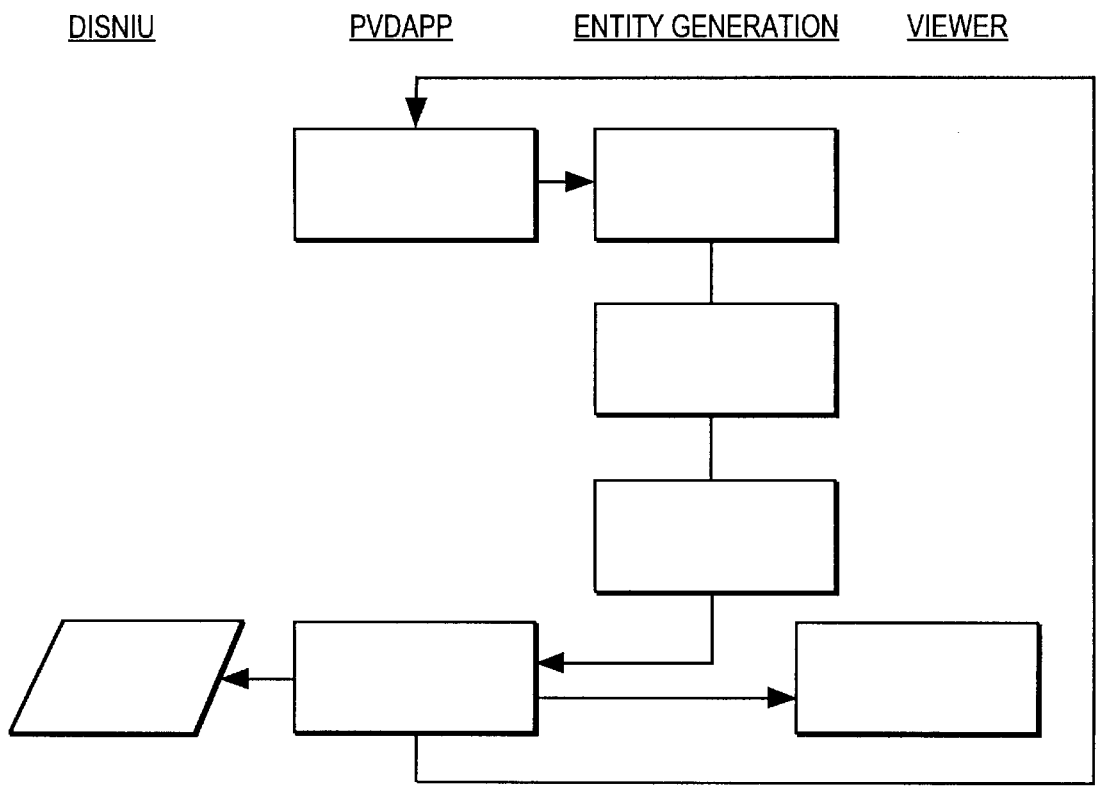

EXAMPLE OF UPDATING GENERATED ENTITIES.
1. PVDAPP: INVOKE ENTITY GENERATION/UPDATE FOR EACH GENERATED VEHICLE:
    2. ENTITY GEN: EXTRAPOLATE ENTITY POSITION AND ATTITUDE GIVEN LAST STATE AND PROJECTED PATH DATA.
    3. ENTITY GEN: IF THE ENTITY HAS A DESIGNATED BEHAVIOR AT THIS TIME (SHOOT, SCAN,...) THEN DERIVE THE DYANMICS (TURN GUN, ETC) AND INCLUDE THE NEW INFORMATION IN THE UPDATE.
    4. ENTITY GEN: FORMAT THE NEW DATA INTO AN ENTITY STATE PDU PACKAGE.
5. PVDAPP: UPDATE DISNIU WITH THE NEW ENTITY INFORMATION
    6. DISNIU: SEND ENTITY STATE PDU TO THE NETWORK.
7. VIEWER: DRAW / REDRAW ENTITY

FIG. 11

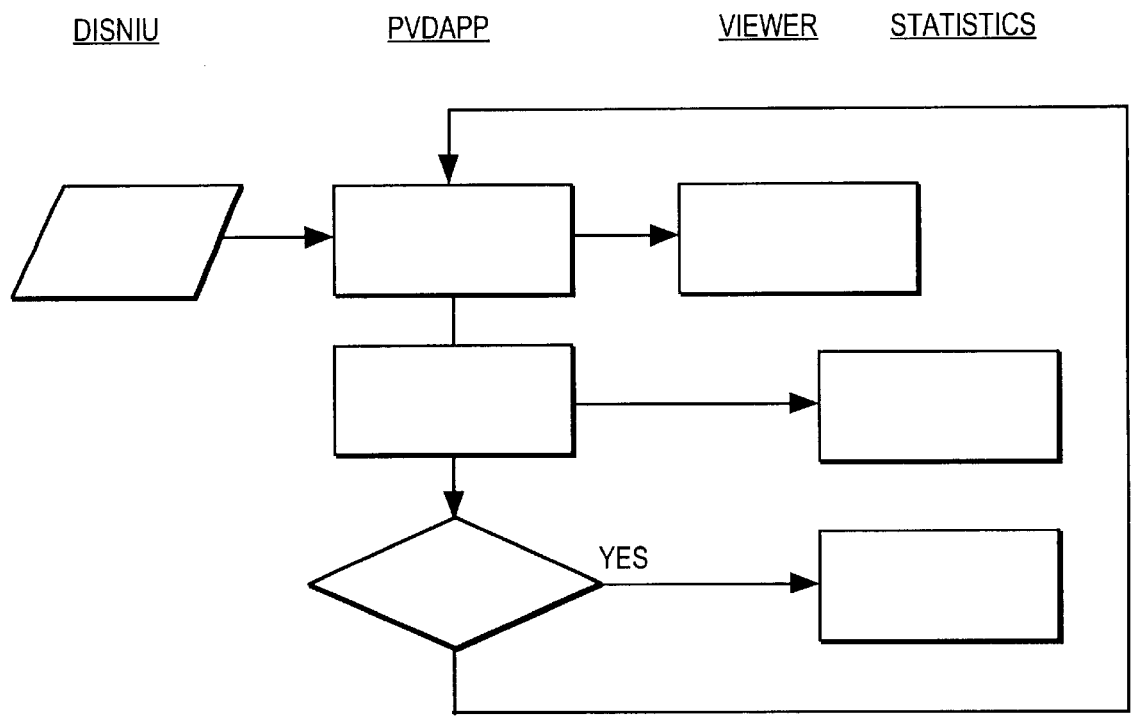

EXAMPLE OF FIRE EXCHANGE UPDATE:
1. DISNIU: RECEIVED AMMUNITION DETONATION EVENT. NOTIFY PVDAPP.
2. PVDAPP: DRAW DETONATION INDICATOR ON PVD 2D DISPLAY
3. PVDAPP: ANALYZE DAMAGE EXTENT. (DETONATION PROXIMITY TO VEHICLES)
4. PVDAPP: UPDATE STATISTICS CLASS WITH DETONATION RESULT.
    5. ATTACKER: DECREMENT AMMUNITION, RECORD TIME AND RESULT OF SHOT.
    6. TARGET: RECORD TIME AND AMOUNT OF DAMAGE RECEIVED.
7. EXAMINE NEXT SIMULATOR UPDATE.

EXAMPLE OF SIMULATOR MOVEMENT UPDATE:
1. DISNIU: RECEIVED UPDATE ON NEW POSITION, NOTIFY PVDAPP.
2. PVDAPP: UPDATE SIMULATOR POSITION ON PVD 2D DISPLAY
3. PVDAPP: CHECK TO SEE IF VEHICLE HAS BEEN DAMAGED SINCE THE LAST UPDATE
4. IF YES:
       5. UPDATE STATISTICS CLASS WITH TIME AND SEVERITY OF DAMAGE
       6. INDICATE DAMAGE IN PVD 2D DISPLAY
7. EXAMINE NEXT SIMULATOR UPDATE.

PVDAPP

EXAMPLE OF THE MAIN PROCESS FLOW CONTROLLED BY THE PVDAPP CLASS.

VEHICLES DESTROYED VS. TIME

| VEHICLE BUMBER # | TYPE | KILL TIME | RNDS FIRED/ RNDS ON BOARD | KILLED BY |
|---|---|---|---|---|
| 078/010/104 | AH64 |  | 0/40 |  |
| 078/010/108 | SHIP |  | 0/40 |  |
| 078/010/101 | M1 |  | 1/7 |  |
| 078/010/105 | AH64 |  | 0/40 |  |
| 078/010/102 | M1 |  | 1/7 |  |
| 078/010/106 | M1 |  | 0/7 |  |
| 078/010/103 | M1 |  | 0/7 |  |
| 078/010/107 | F16 |  | 0/40 |  |

FRIENDLY EFFECTIVENESS

☐ LETHAL SHOTS
▨ NON-LETHAL SHOTS

ENEMY EFFECTIVENESS

☐ LETHAL SHOTS
▨ NON-LETHAL SHOTS

DISTRIBUTED INTERACTIVE SIMULATION EXERCISE MANAGER SYSTEM AND METHOD

FIELD OF THE INVENTION

The invention pertains to control and management systems and methods for use with multiple, simultaneously operating, simulators. More particularly, the invention pertains to computer based control systems and methods which communicate with and provide direction to a plurality of different simulators wherein ongoing simulations may be occurring simultaneously, and wherein the simulators themselves might be quite different from one another.

BACKGROUND OF THE INVENTION

There has long been a continuing and important need for tools which can be used to monitor and help evaluate training exercises for a variety of different training equipment and training scenarios. Known observation, compilation and formatting techniques are unable to efficiently handle the large quantity of data which can be developed and preferably is capturable during large scale training exercises.

In addition to an outstanding problem in data collection, known techniques and systems are unable to provide relatively short term turn-around of exercise results where large scale exercises have taken place. From an educational and training perspective, short turn-around times are preferred.

It has been observed, using the Army National Training Center as a model that, the turn-around time for a training debrief of a company-level exercise may require hours or weeks, depending on the number of participants and the level of detail in the critique. FIG. 1 illustrates elapsed times associated with various known training evaluation techniques.

In an attempt to address some of the previously recognized problems, both in terms of different types of training equipment as well as turn-around times needed for evaluation of an exercise, a standardized interactive network and protocol have been established. Known as the "Standard for Distributed Interactive Simulation", published by the Institute for Simulation and Training, Orlando, Fla., and available as IEEE Publication 1278.1 a network is defined which provides a common communication format or protocol for use in simulation systems and networks. This standard, known by the acronym of DIS creates a training environment wherein dissimilar training devices are able to receive or transmit information via the common format or protocol. As a result, that information can be accessed as needed by other DIS applications.

The information is transmitted in standardized format data packets, known as DIS protocol data units (PDU). A substantial quantity of PDU-type information is available on the network during a training exercise.

The PDU information, if properly acquired and utilized, potentially provides a vehicle for not only dealing with a variety of different training devices, but also an opportunity to provide improved management and control of an exercise, using fewer observers, to eliminate not only an error prone information collection and collation process, but also to provide an evaluation of the exercise in a much shorter time period. Hence, there is an ongoing need for systems and methods which can make effective use of large quantities of PDU-type information generated during a training exercise on a DIS-type network so as, at the very least, to provide more accurate evaluations of an exercise with shorter turn-around times. Preferably, such systems and methods could take full advantage of the standardized DIS-type protocol.

One feature that is available to influence a virtual battlefield is DIS Simulation Management (SIMAN). SIMAN refers to a special set of DIS PDUs that can influence any of the participants or automated foes in an exercise. The detailed definition for SIMAN can be found in "Enumeration and Bit-encoded Values for use with IEEE 1278.1-1994", published by Institute for Simulation and Training, 1994.

SUMMARY OF THE INVENTION

A system in accordance with the present invention can collect, consolidate and present the training information generated during a training exercise, involving dissimilar training devices, by means of a standardized network protocol. As a result, a single operator can replace multiple field observers, eliminate the information collation process and provide reports and exercise critiques with very short turn-around times.

In addition, systems and methods in accordance with the present invention enable a training manager to create, monitor and review a simulation-based training exercise which can be carried out via a variety of different training devices, all of which can be in communication with, and under the overall control of the exercise manager system by means of a standardized communication protocol. Further, the training manager is able to play an active part in the exercise and create a variety of battlefield situations, such as injecting automated vehicles into the exercise at one or more of the training devices, as appropriate, or alter other parameters of the exercise in order that the respective training participants will have an opportunity to develop and improve their respective skills.

Further, a system and method in accordance with the present invention enable the training manager to produce on a relatively short term basis, reports and summaries of a training exercise. The manager can also provide stored representations of the exercise which can be accessed after the fact by exercise participants or reviewing personnel for educational and evaluational purposes.

In accordance with one aspect of the invention, a clear, consistent, and easy-to-use graphical user interface (GUI) is provided. Each training stage is represented as a different mode of operation within the same interface. The GUI provides a two dimensional overview of the virtual geographical area of the exercise. This "Viewer" containing the geographical information is used in each of the different modes of operation.

The information contained in the Viewer is common for all dimensional models, and elevation contours. A world-coverage default data set is provided using Digital Chart of the World data from the U.S. Geological Survey, and can be enhanced with high-detail insets from other databases. Additional backdrop information coordinates overlay the Viewer and can be dynamically scaled as the user chooses to zoom down to an area several feet across, or out to the world projection map.

The zoom and pan options are activated using simple mouse actions or arrow keys, and are unconstrained. Other tools are available to determine distances and inter-visibility between two locations.

In yet another aspect of the invention, using an overview of the exercise area as a backdrop, the trainer can draw tactical bounds and symbols over the displayed terrain to show proposed defensive and offensive positions using standard military tactical symbols. The trainer may also draw the anticipated path of each vehicle in the exercise, and designate actions such as stop, accelerate, fire at target, scan the area, and track opposing vehicles.

Once the exercise is drawn, it is converted into a DIS PDU log file or broadcast to the network. With this technique, the exercise can be planned, animated, refined and regenerated until the desired scenario is achieved.

Further, the manager system provides various tools that can be accessed during several modes of operation to affect the exercise. The first of these tools is an integrated interface Data Logger, to record or playback logged PDUs.

The same animation technique used in exercise creation can be used as a tool to introduce virtual friendly or opposing vehicles into an exercise that may already contain manned simulators. The manager system can control the behavior of the automated vehicles and the interaction between them and the live players.

In another aspect, the manager system can monitor any live interaction on the DIS network, or collect data on a previous exercise that has been stored as a DIS PDU log file. Activity can be monitored in the two dimensional display, the Viewer, of the trainer.

Each vehicle is drawn on the terrain displayed in the Viewer, and is shown with proper orientation. Interaction such as firing events and collisions are also drawn in the overview and color-coded to imply hits and damage received.

Detailed information describing each participant, including performance statistics, may be displayed at any time. Statistics are automatically collected on all participants throughout the exercise.

In response to the amount of activity and distractions that may be happening during a training exercise, the Viewer provides several hands-off tracking capabilities. The trainer can lock on to a particular vehicle and set it to be in the center of the display at all times. The trainer can also pick a vehicle from the DIS entity list by name, and snap the Viewer to that position. In either case, the trainer does not have to spend time searching for the battle if he/she has stepped away from a period of time.

In addition to the viewed two dimensional perspective, the manager system, under the commands of the trainer, can choose the three dimensional perspective for a simulator image generator. The trainer can select any of the vehicles displayed on the two dimensional Viewer, and select the desired perspective view relative to the vehicle. With this mechanism, the trainer can rapidly cross the terrain or the battlefield and analyze what each participant sees.

During monitor mode the manager system will automatically tag significant events, such as the first shot fired or percent attrition of friendly and opposing forces. The trainer/observer can also tag events manually. Each tag can automatically contain information on the time and location where the event occurred, pictures and movies of the event, selected applicable military doctrine and selected or entered commentary.

Further, by the end of the exercise, all data has been stored in a standardized log file. By playing back the log file the scenario can be animated in an overview, reviewed at faster or slower than normal speeds, or rapidly advanced to show significant events. The re-animation can also be used as a presentation tool to supplement the after action review process.

While the scenario is being reviewed, the trainer can elect to delete events, modify events, or insert new events. The collected statistics and tagged events will become the structure of the After-Action Review package.

The After-Action Review package can include statistical and event-based data, as well as pictures and movies of the trainer's display. The statistical data can be grouped into performance charts and graphs. The event-based data includes time stamps, commentary, doctrinal quotes, captured pictures and movies, and are ordered to best represent the flow of events in the exercise. The types of graphs and presentation system can be customized.

In another aspect of the invention, an HTML based report can be produced by the present system and method. This report can be viewed using an HTML browser (such as the NETSCAPE browser), transferred to another platform (PC, MAC, UNIX, etc . . . ) or distributed via the World-Wide Web. This distribution capability has an advantage of providing joint DIS exercises to participants across the country or across the world All participants can receive performance feedback within minutes. The document may also be transferred to a storage media (such as a floppy disk) to review on a home PC.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWINGS

FIG. 4 illustrates the overall steps of the process of managing and carrying out a simulation exercise in accordance with the present invention;

FIG. 5 is a diagram illustrating the architecture of an exercise manager in accordance with the present invention;

FIG. 10 is a flow diagram illustrating updating of generated entities;

FIG. 11 is a flow diagram illustrating the steps of updating a fire exchange;

FIG. 16 illustrates and yet another alternate summary report;

DETAILED DESCRIPTION OF THE PREFERRED EMBODIMENT

Figure 1:
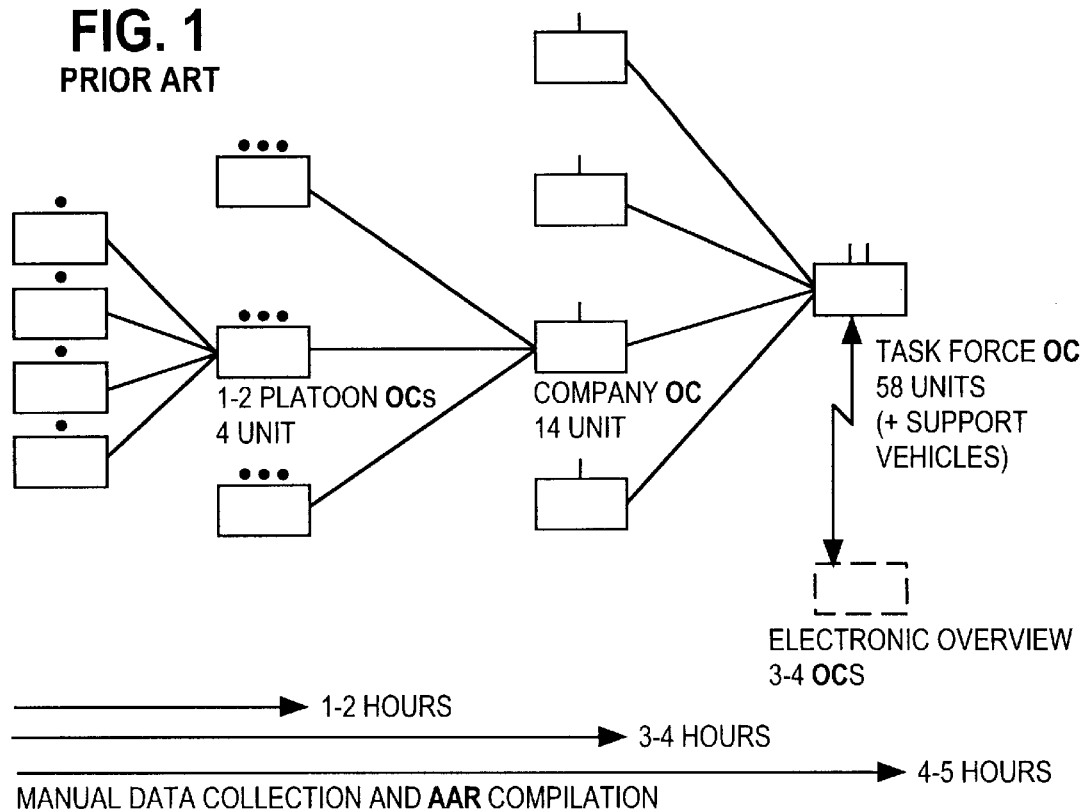
FIG. 1 is an overall flow diagram of a known training evaluation process.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 2:
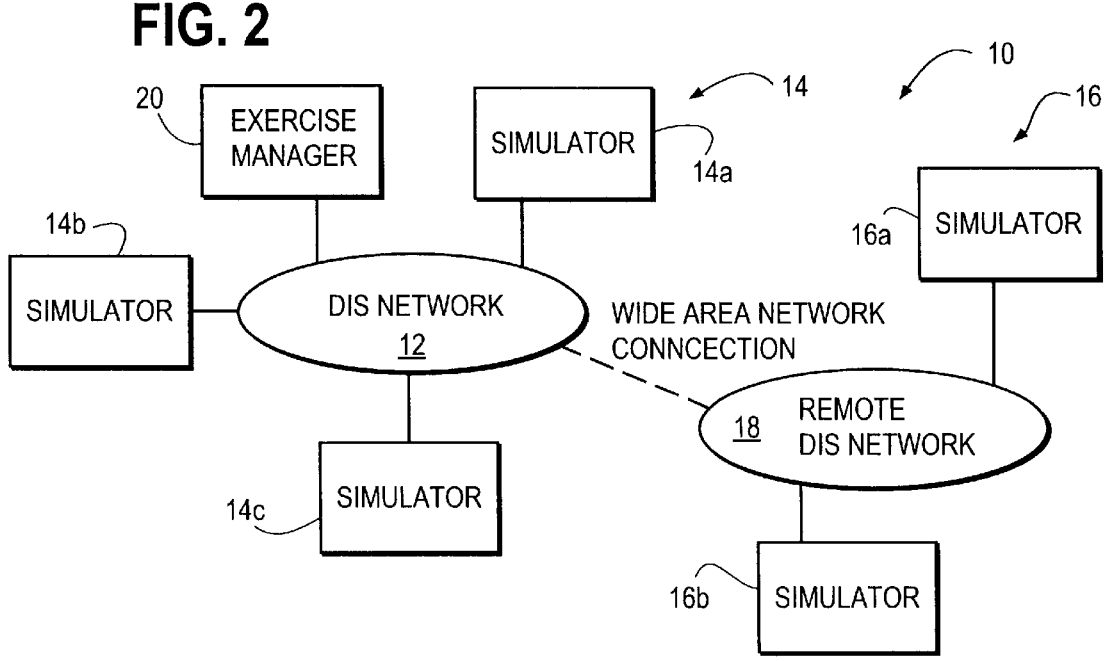
FIG. 2 is an overall block diagram of a system for managing a simulation exercise in accordance with the present invention.

FIG. 2 illustrates a system 10 in accordance with the present invention. The system 10 includes a DIS network 12 of the type described above which performs in accordance with the DIS standards. Coupled to the network 12 is a plurality of simulators 14 having members 14a, 14b and 14c for example.

The simulators 14 can be the same or they can be different. However, each of the simulators 14a . . . 14c communicates using the standard DIS protocol on the network 12.

The network 12 could also be coupled to a remote, similar, DIS network 18. The networks 12 and 18 could be coupled via cables. Other types of wide area data links could be provided such as telecommunications links or direct radio links. Coupled to the network 18 is a second plurality of simulators 16 having elements for example 16a and 16b.

Coupled to the network 12 is an exercise manager system 20 in accordance with the present invention. The system 20, as described subsequently, enables an operator or trainer to create, monitor and review a simulation training exercise in which the simulators 14 and 16, for example, participate. Additionally, the manager system 20 can generate after action training files, based on data collected during the exercise for review after the fact.

The system 20 also enables the trainer or operator to participate actively in the ongoing training exercise by creating incidents in the virtual environment. For example, if the virtual environment is a virtual battlefield, the operator or trainer is able to create automated vehicles. which will appear and behave realistically in the visual fields of the simulators 14 and 16. Other inputs are available to the trainer.

Figure 3:
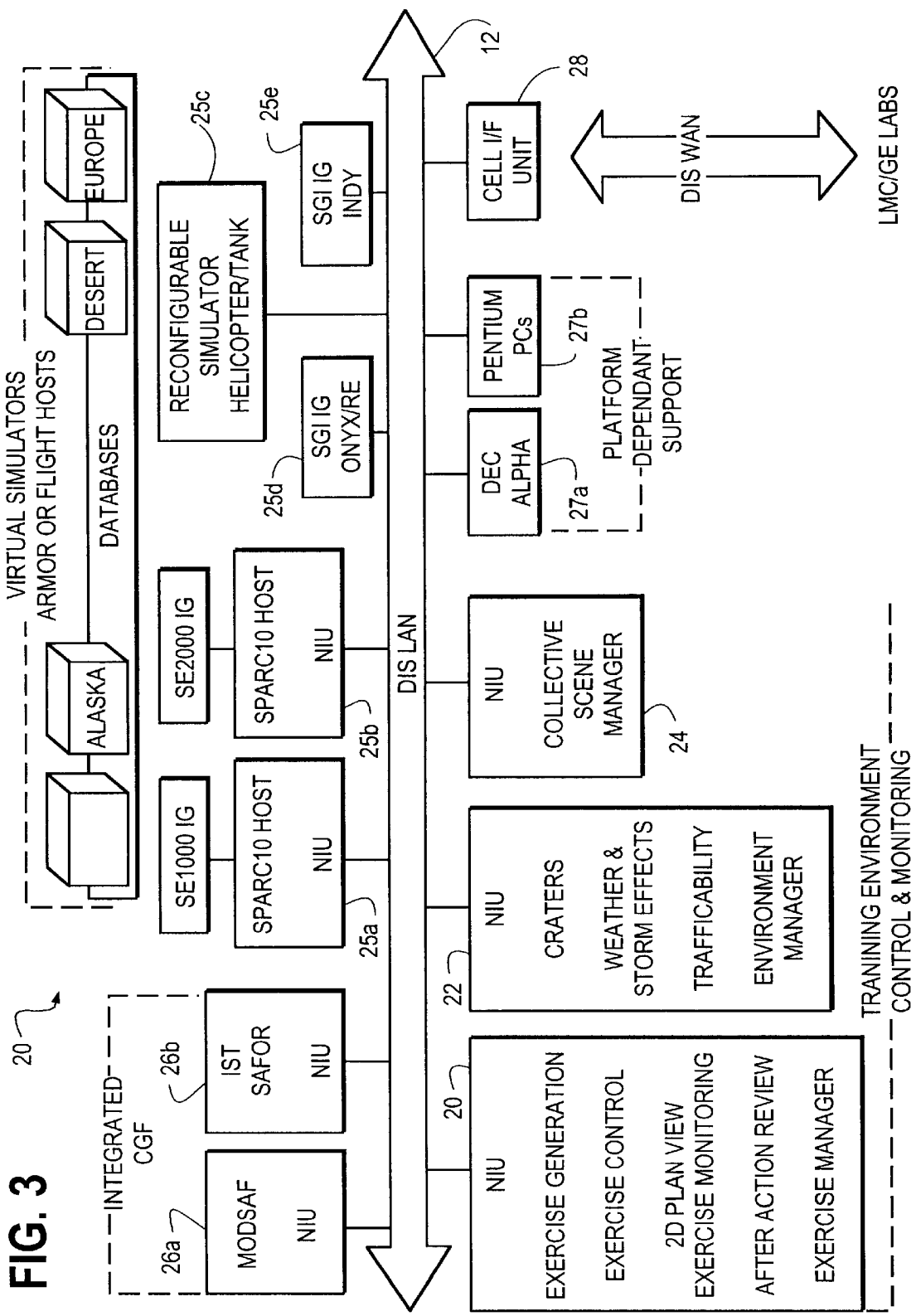
FIG. 3 is an overall system diagram, in more detail, illustrating aspects of the hardware and software associated with the system in accordance with the present invention.

FIG. 3 is a system diagram illustrating more detail, various aspects of the exercise manager 20 along with related support software. The exercise manager 20 communicates with the DIS network 12 via a network interface unit (NIU). The NIU passes information in the form of PDUs to calling programs through a pre-established protocol.

The respective NIU handles not only communication between the DIS application system, such as the exercise manager system 20 and the network 12, it also automatically provides various types of interrelated data, such as estimates of dead-reckoned vehicle positions to the manager system 20 when transmission of data on the network 12 is delayed. Hence, the exercise manager system receive a constant stream of information or data to process.

The NIUs comply with the requirements imposed by a preset standard, "Standard for Distributed, Interactive Simulation-Application Protocols Version 2.0" (1994), Institute for Simulation and Training, Orlando, Fla.

Other modules illustrated in FIG. 3 which cooperate with and support the activities of the exercise manager system 20 are an environmental manager 22 and a collective scene manager 24.

The simulators 25a . . . 25e are different type of simulators communicating via the DIS standard protocol. On the DIS network 12 the computer generated forces 26a and 26b are additional tools that generates DIS type data for automated vehicles and opposing battlefield forces.

System 27a and 27b are supporting workstations that provide additional data logger capacity and additional processing.

System 28 is a cell interface unit that provide telecommunications links to other remote systems.

FIG. 4 illustrates the various phases of the process carried out by the exercise manager 20. A computer system 30 into which the software for the exercise manager system 20 has been loaded, is in communication with network 12.

Prior to carrying out the exercise, in an initial phase 32, the trainer or operator is able to display, for example, on the display for the system 30, an overview of the exercise area as a backdrop. As illustrated in the phase 32, the trainer can establish tactical boundaries and symbols on the displayed exercise area to established proposed offensive and defensive positions using standard military tactical symbols.

The trainer or operator can also at this time establish the anticipated path for each vehicle to be present in the exercise and also to designate various actions such as stop, accelerate, fire at a target, scan an area or track opposing vehicles. Subsequently, the operator can review, in an animated preview, the defined exercise.

Once the exercise has been established, it can then be converted in a standardized DIS PDU log file and stored. Additionally, it can then be broadcast to the simulation units 14, 16 on the network 12. Prior to transmission of the exercise information to the simulation units 12, 16, the operator or trainer can further revise or animate the exercise to achieve the desired scenario.

In a phase 34, the operator is able to monitor the ongoing exercise, while it is being conducted, via the display on the system 30. The display for the system 30, under control of the manager software 20 illustrates the elements of the exercise as the various simulation units 14, 16 are carrying out the exercise on the virtual terrain or battle field.

While the exercise is underway, the trainer or the operator can introduce either friendly or opposing equipment, such as vehicles or the like, into the virtual terrain, being presented by the simulators 14, 16 and displayed for the operator simultaneously under the control of the exercise manager system 20. While the exercise is underway, the exercise manager system 20 dynamically controls the behavior of these introduced virtual vehicles as well as the interaction between them and the trainees or operators of the simulators 14, 16.

Additionally, the exercise manager can alter the sequence of the ongoing exercise by issuing DIS simulation management commands (SIMAN). Such commands enable the trainer or exercise manager to freeze the exercise at a critical point, resume the entire exercise, or change the characteristics of a selected virtual vehicle such as changing its alignment from friendly to opposing.

In a final phase 36, after the training sequence has been completed, the exercise manager system 20 can replay the stored exercise on the system 30 for evaluation, comparison and generation of reports. Further, the exercise manager system 20 can write to a removable medium one or more files containing the information to replay any portion of or the entirety of the stored exercise for purposes of after-the-fact analysis. The exercise system manager 20 can also provide a variety of statistical information and reports based on the performance of the simulators 12, 16 during the exercise.

FIG. 5 illustrates the architecture of the exercise manager system 20. The exercise manager system 20 incorporates five different operational functions.

A planning function 20a carries out the exercise generation and preview phase 32 discussed previously in which the training manager or operator establishes the parameters of the exercise. The control functionality 20b carries out initialization of the exercise process, conducts the exercise on a basis which approaches a real time interaction as closely as possible, and provides various view points as selected by the operator or trainer when the exercise is underway.

The exercise manager's monitoring functionality 20c collects statistics during the time the exercise is underway, and tags significant events for review subsequently. The exercise manager's review functionality 20d makes it possible for the exercise operator or trainer to play back and review the prestored exercise prior to creation of the after action review materials.

The after action review functionality 20e implements the after action review phase 36 discussed previously and enables the operator or exercise manager to create a plurality of after-the-fact review or study materials, store same at a Web site and make those materials available to after-the-fact reviewers who can access them via an appropriate browser.

Underlying the exercise manager functionality 20a . . . 20d is an interface layer which incorporates display creation software 20-1 as well as control software 20-2 which in turn communicates with the DIS interface software. The system 20 can be loaded for example, onto various hardware platforms such as the SUN SPARC Station or a DEC Alpha. A variety of networks can be interfaced to the platform hardware so long as the DIS system protocol is adhered to.

Figure 6:
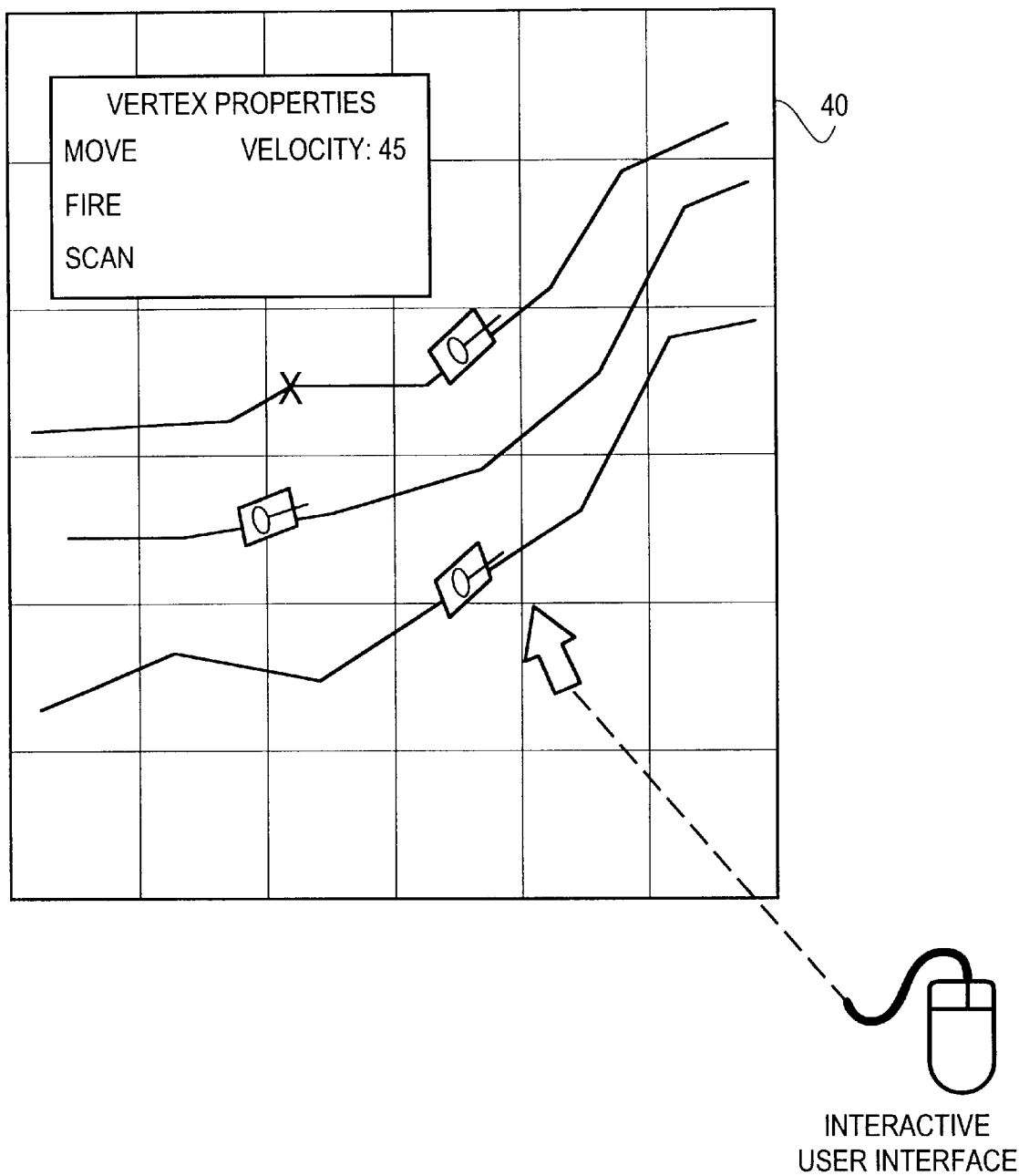
FIG. 6 is a diagram illustrating a process of establishing characteristics of a simulation exercise in accordance with the present invention.

FIG. 6 illustrates the process in phase 32 of establishing a virtual terrain 40 on the display for the system 30. FIG. 6 also illustrates the process that the manager or trainer carries out to specify vehicular characteristics in the virtual terrain.

Figure 7:
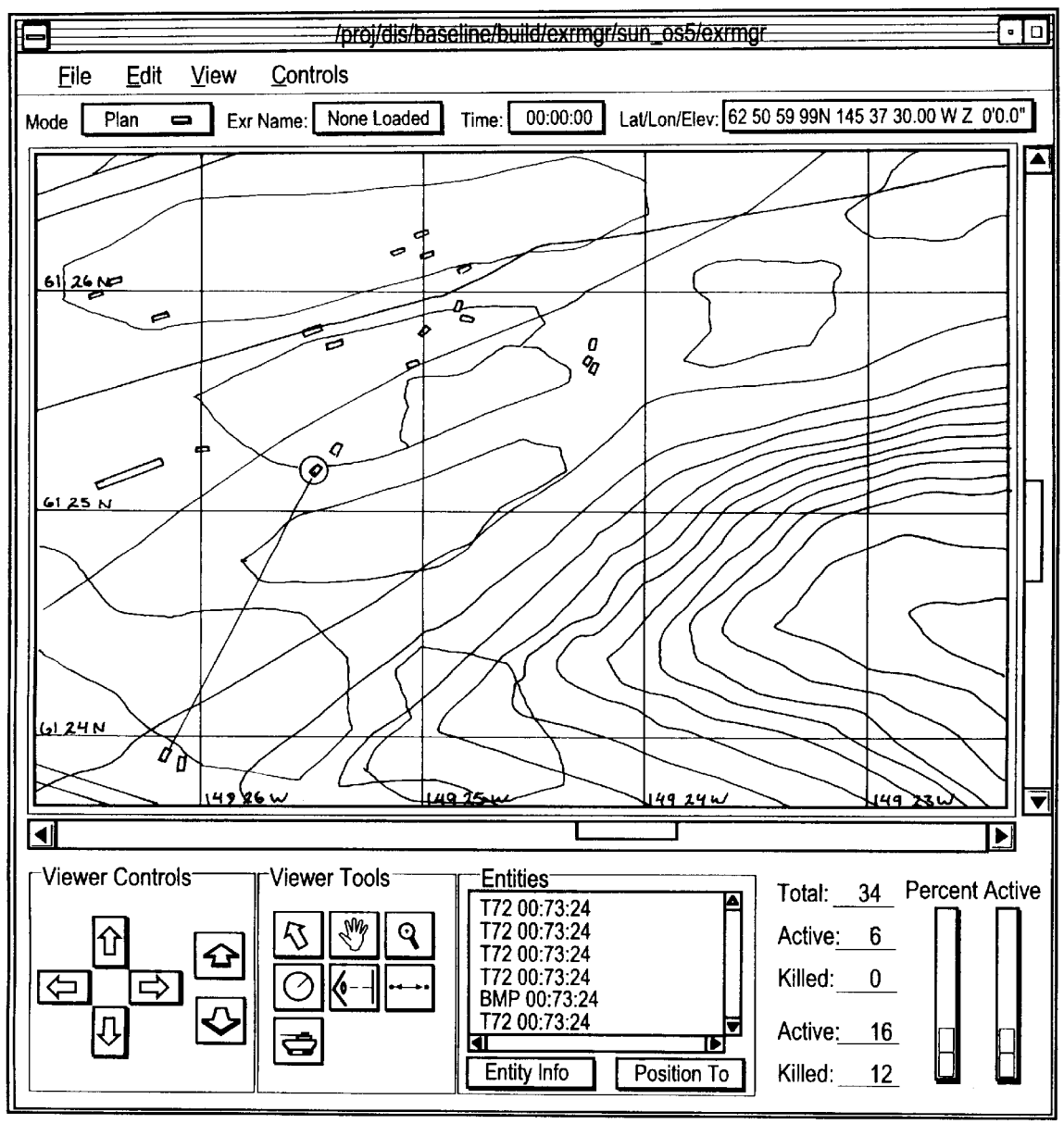
FIG. 7 is a view presented by an exercise manager in accordance with the present invention of the geographical/physical aspects of a portion of the simulated region is which the exercise is to be conducted.

FIG. 7 illustrates a representative display 42 presented by the manager system 20 to the trainer or operator during the monitoring phase 34 while the training exercise is underway. In this regard, the exercise manager system 20 is able to monitor all of the live interactions on the DIS network 12 for purposes of presenting a display, such as the display 42, of the ongoing exercise for review by the manager or trainer.

Vehicles are drawn on the terrain of the display 42 with proper orientation and interactions, such as collisions or firing events are also indicated on the display 42 to convey information, by color coating, concerning, for example, hits or damage received in each instance. Further, the exercise manager system 20 provides to the trainer or operator, on the display 42, an ability to track particular objects or vehicles without having to search for the desired object or vehicle.

Tagged events, which are noted during the monitoring mode 34 include for example, the first exchange or shot which was fired, or the percent of friendly and opposing forces. The trainer, using the system 20 can also tag selected events manually. Each tagged event automatically contains information as to time and location where the event occurred, graphics of the even, and any commentary which has been provided.

Figure 8:
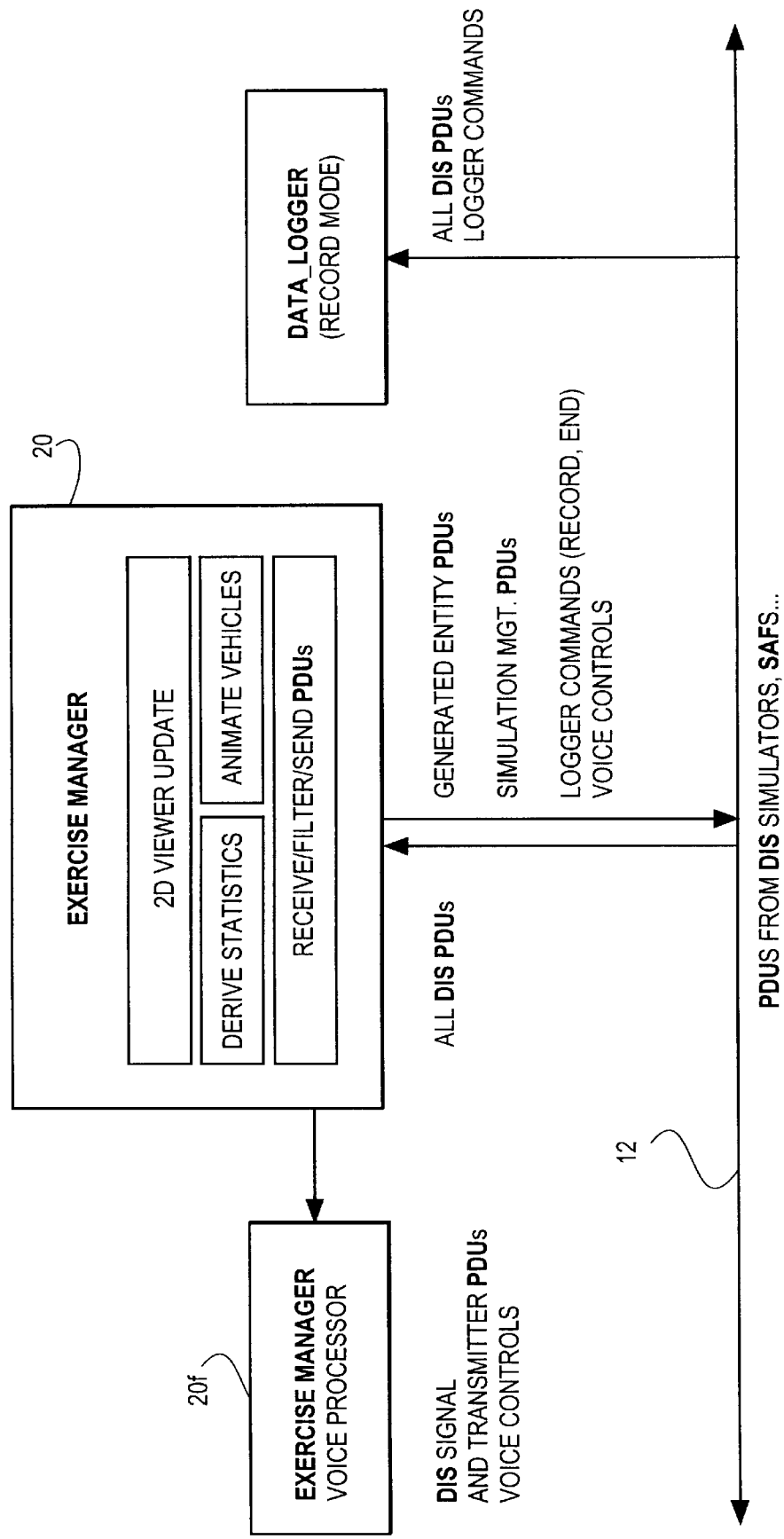
FIG. 8 is a diagram illustrating characteristics of the exercise manager system when monitoring an ongoing simulation at a plurality of training devices.

FIG. 8 illustrates the various aspects of the exercise manager system when in the monitor mode or phase 34. As illustrated in FIG. 8, the two-dimensional viewer software 20-1 continually updates the display, such as the display 42 presented to the trainer or operator. Simultaneously, the manager system 20 is acquiring statistics as well as updating the location and characteristics of virtual vehicles in the virtual geography. The system 20 continuously receives and sends PDUs to the simulation units 14, 16 via the network 12.

Voice processing can be provided via a voice processor capability 20f.

The exercise manager system 20 could be implemented, for example in C++ as an application written in accordance with Object-oriented Design (OOD) methodology. It was designed and implemented so as to be compatible with the POSIX software standard, the MOTIF user interface standard and the OpenGL 3D graphics standard.

The exercise manager system 20 is organized into several major software components, referred to as "classes". Each class is responsible for maintaining its unique type of data and controls how that data is manipulated.

The exercise manager system has a main Plan View Display Application class (PVDApp), which invokes several different subordinate classes depending on the mode of operation. The classes represent the components of the application, and the models of operation represent the functional flow.

The word vehicle refers to a manned simulator, or a semi-autonomous computer generated vehicle that appears as if it was a manned simulator. The exercise manager system 20 is capable of receiving remote manned simulator information as well as generating its own vehicles as part of a single exercise.

An entity usually refers to a vehicle, although it may also refer to a ammunition, such as a missile, or a person in the simulation.

An Entity State PDU is an information packet that has an instantaneous description of an entity and is in a formal that is acceptable for a DIS network.

Figure 9:
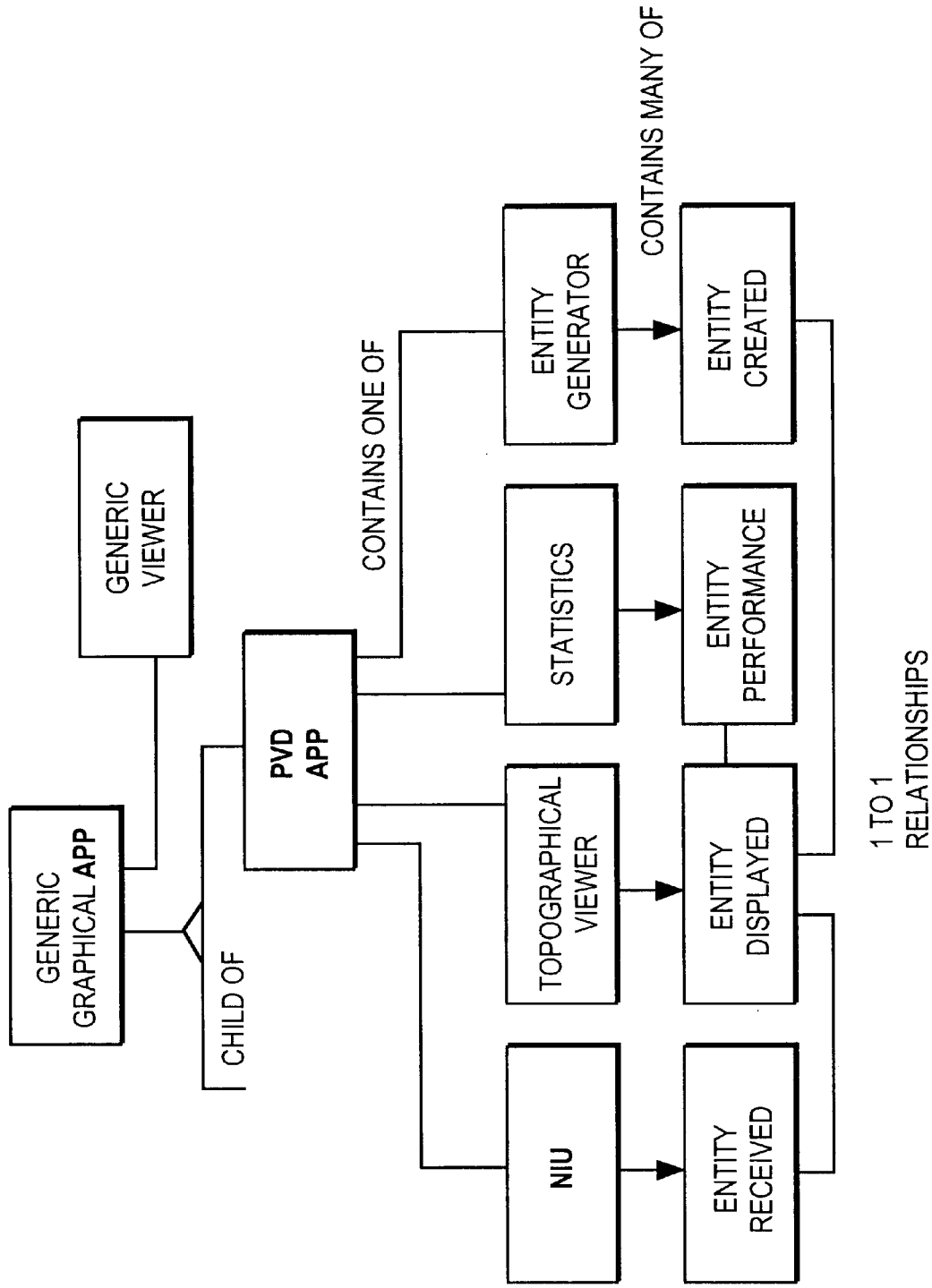
FIG. 9 is a diagram illustrating manager system object classes and relationships.
Figure 12:
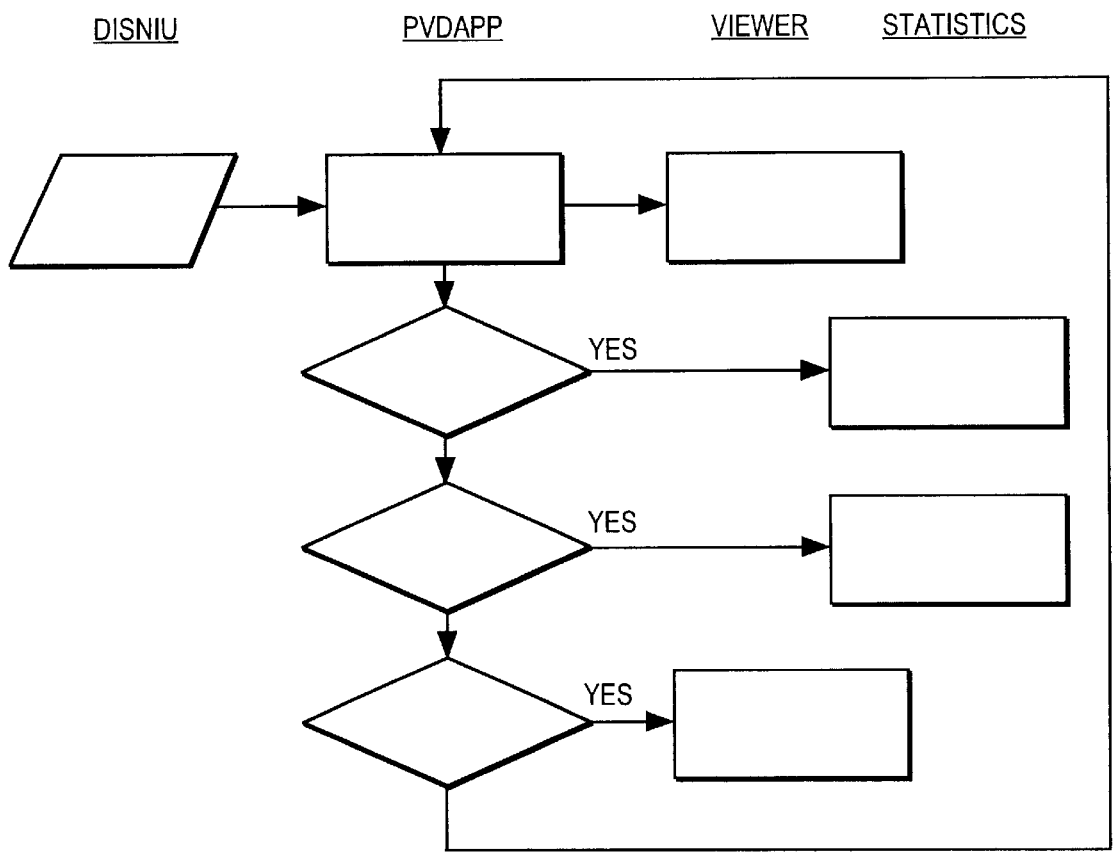
FIG. 12 is a flow diagram illustrating the steps of simulator movement.
Figure 13:
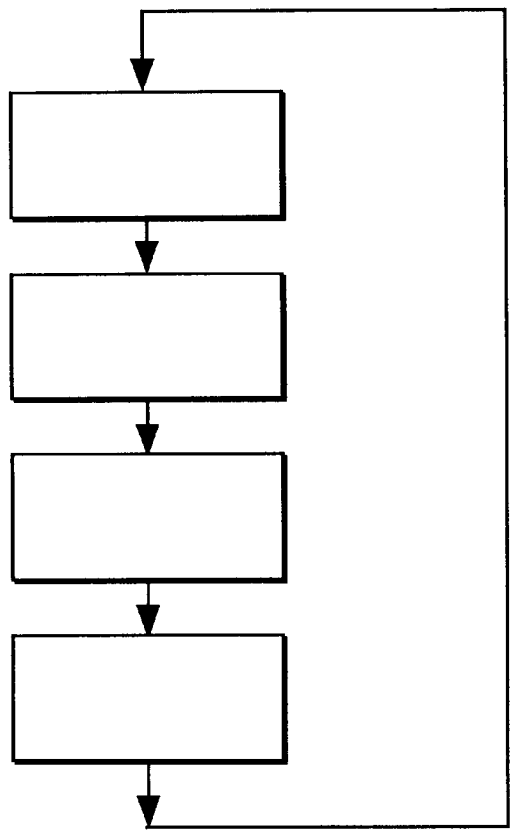
FIG. 13 is a flow diagram illustrating main process flow associated with the PVDAPP class.
Figure 14:
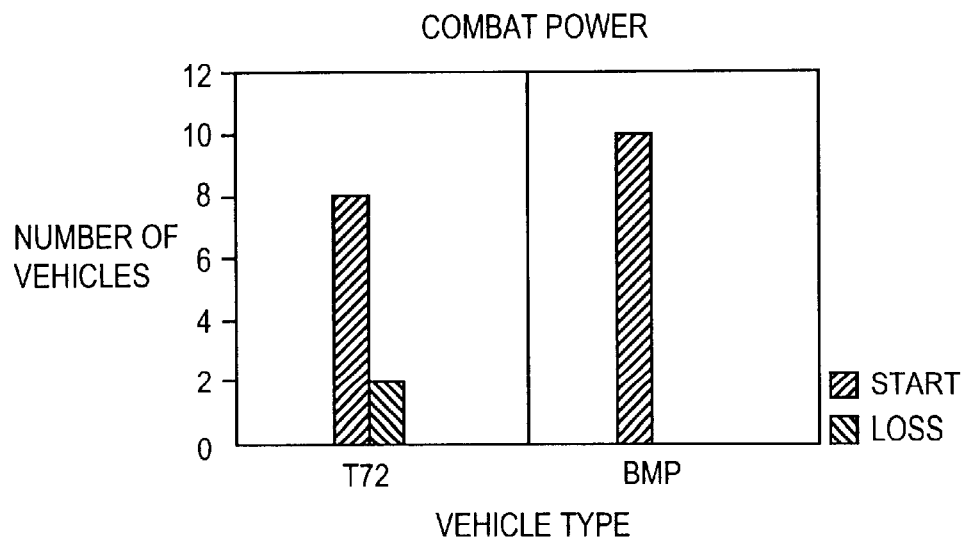
FIG. 14 illustrates mission summary report diagrams.
Figure 15:
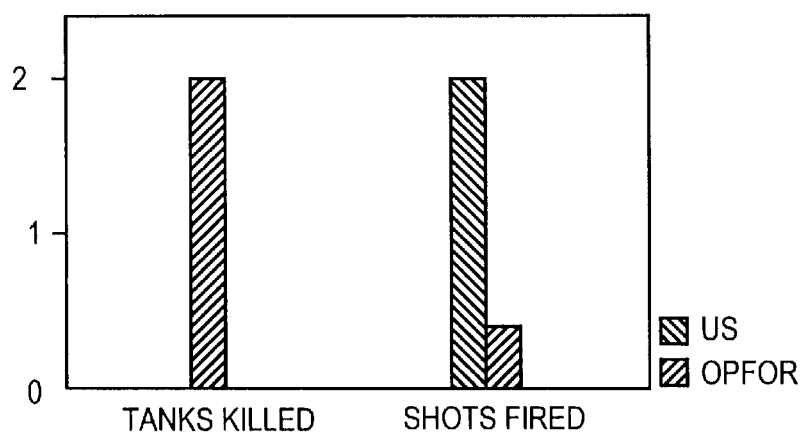
FIG. 15 illustrates an alternate summary report.
Figures 16, 17:
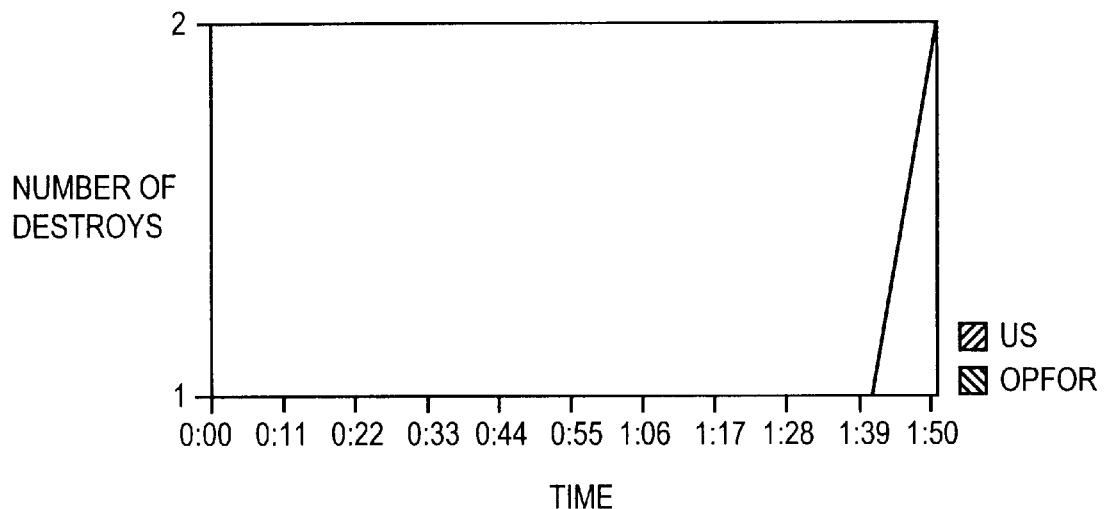
FIG. 16 illustrates an alternate summary report.
FIG. 17 illustrates a tabular representation of exercise results.
Figure 18:
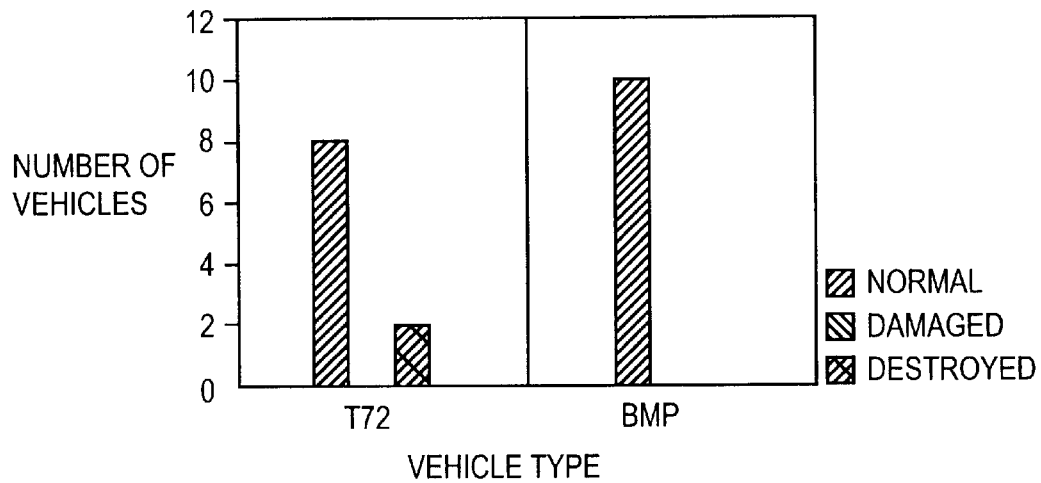
FIG. 18 illustrates casualty reports of one of the forces.
Figure 19:
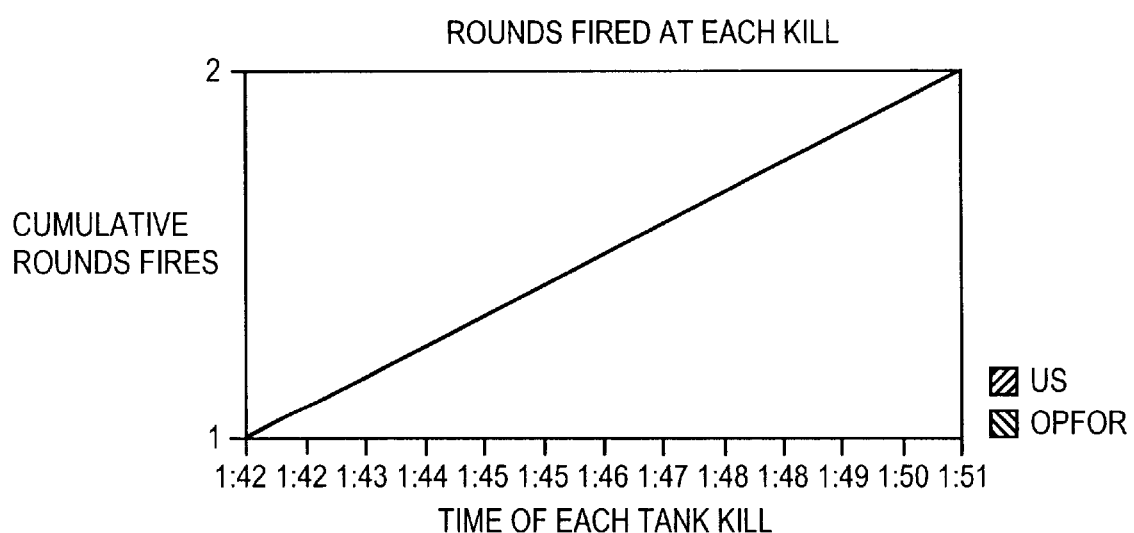
FIG. 19 illustrates rounds fired vs. time graphically.
Figure 20:
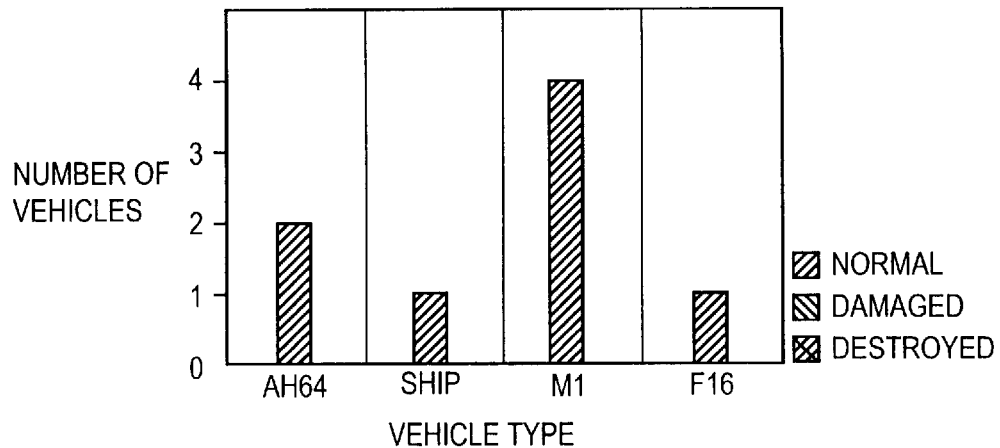
FIG. 20 illustrates casualties experienced by one of the forces during the exercise.
Figure 21:
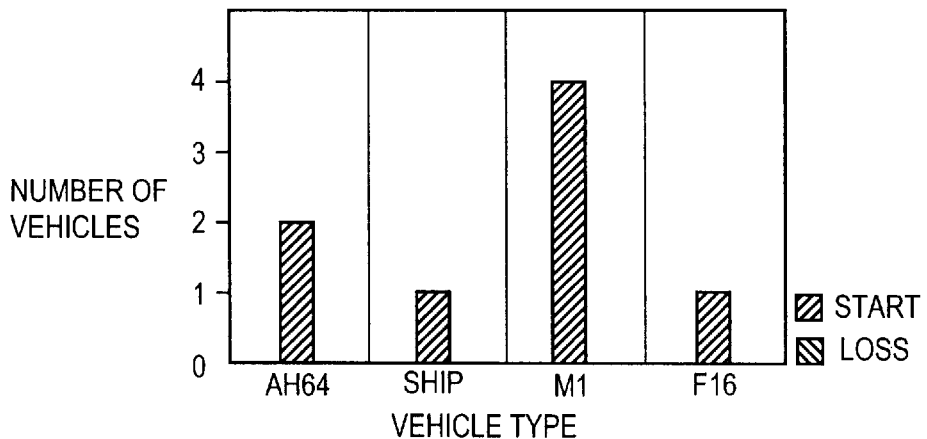
FIG. 21 illustrates mission summary and characteristics of one of the sides of the exercise.
Figure 22:
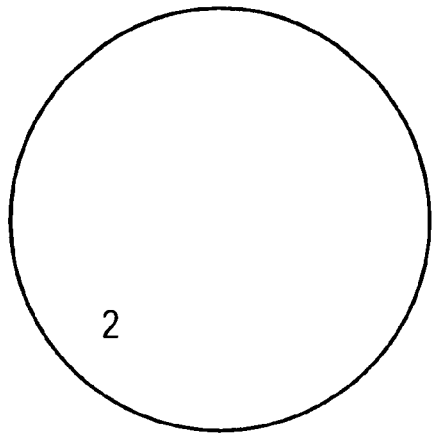
FIG. 22 is a pie chart illustrating shooting effectiveness.
Figure 23:
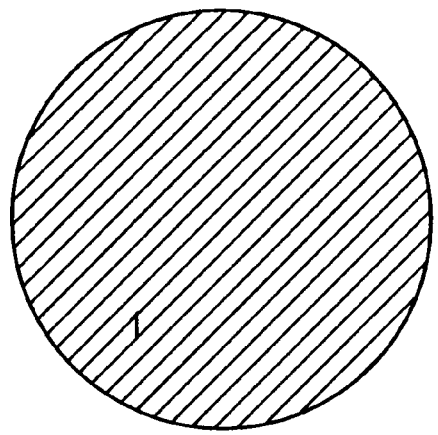
FIG. 23 is a pie chart illustrating shooting effectiveness of the other side of the exercise.

With respect to FIG. 9, the manager system 20 includes:

PVDApp class which inherits the basic 2D graphical draw, display and edit capabilities from the Generic App class. PVDApp is the main controlling class of the exercise manager system 20 and manages the updates to the remaining member classes.

The viewer class tailors the Generic Viewer functions to provide a 2D geographical Viewer of the engagement area with an overlay of vehicle positions and interactions sent from PVDApp. The Viewer contains many Displayed entity Views.

The DisNiu class monitors all DIS PDU traffic, interpolates PDU data if no update is available, and make the information available to PVDApp. This information includes but is not limited to vehicle positions, firing events, and detonations. DisNiu receives and sends many Entity State PDUs.

The Entity Creation class can generate and control "virtual" vehicles that can interact with manned simulators. Updates to these vehicles are sent to PVDApp.

The Statistics class creates many entity statistics records, one for each vehicle encountered by PVDApp, and updates the records according to PVDApp events.

The above noted classes are used in the various modes of operation as follows:

In Plan mode 32, PVDApp allows the user to create vehicle paths and data by interacting with the Viewer and storing the entered or drawn data.

In Monitor mode 34, PVDApp samples the DisNiu class for data and updates the Viewer class, user interface, and statistical classes. It also responds to user requests to record snapshots or use SIMAN functions.

In Review mode, PVDApp samples the DisNiu for playback data and updates the Viewer class. PVDApp also responds to snapshot editing requests.

In the After Action Review mode 36, PVDApp acquires the statistical data gathered in the Statistical class, and creates one or more reports.

Distributed Interaction Simulation (DIS) and the DisNiu Class: with a DIS network Interface Unit, a DIS application can be "dropped in" to an existing DIS network, such as the network 12, without need for any direct integration to the other DIS applications present. The exercise manager system 20 takes advantage of this capability to send and receive information to and from the DIS network 12 so it can recognize monitor and record the performance of any type of DIS simulator (i.e. planes, helicopters, tanks, cars, ships, submarines, etc . . .) PDUs are broadcast across the network 12 from each type of simulator, 14a . . . 14c, and are updated at least every 5 seconds, according to the DIS standard. The exercise manager system 20 captures and uses threshold PDUs to display and analyze the performance of each simulator, 14a . . . 14c, as well as the overall performance of the force represented by a group of simulators such as the plurality 14.

The following DIS PDUs and relevant data are used by the exercise manger system 20:

Entity State PDU
  name/id
  type
  alignment
  location
  orientation
  velocity
  appearance
Fire PDU
  firing vehicle id
  missile type
  location
Detonation PDU
  firing vehicle id
  target vehicle id
  detonation location
  detonation fuse type The DISNiu class, discussed previously, is a generic implementation that passes PDUs to the calling programs through registered callbacks. The DISNiu not only handles communication between the DIS application and the DIS network, it also automatically provides interpolated data, (such as dead-reckoned vehicle positions) to the DIS application when the network data is delayed. This provides the DIS application a constant stream of data to process.

During the monitoring phase 34, with respect to FIG. 8, as the DISNiu receives data from other simulators such as 14a . . . 14c, on the DIS network 12, it notifies the application class (PVDApp) through defined call mechanism known as a registered callback. Depending on which callback is triggered, the application class will react in the appropriate manner. Examples of how the classes react when monitoring simulators such as 14a . . . 14c, are illustrated in FIGS. 10–13.

With respect to phase 36, after monitoring the training exercise and refining the snapshot list, the operator or trainer may choose to automatically format all statistical data into an After Action Review package. This package is formatted in Hypertext Markup Language (HTML) and may be viewed on the Internet using a Web browser. Before formatting, the statistical data contains a descriptive record of each vehicle or simulator:

Example of a Statistical Record for a Single Vehicle:
  vehicle name, type, alignment (friend or foe).
  starting ammunition, starting position, starting time.
  time of each shot fired and firing result.
  time of each hit received and damage result. (mobility, fire power, catastrophic).

The formatting process can combine this data in several ways to generate statistical chart of various types such as:

| CHART TITLE | CHART STYLE | VEHICLE STATISTICAL DATA USED |
| --- | --- | --- |
| Mission Summary | Bar | Summation of vehicle alignment |
|  |  | Summation of vehicle damage |
| Forces Killed and Shots Fired | Graph | Summation of each shot fired |
|  |  | Summation of each catastrophic kill |
| Action Summary | Graph | Time of each catastrophic kill graphed across total number of catastrophic kills |
| Direct Fire Statistics | Table | For each friendly vehicle: name, type, time killed, ammunition killed by |
| Rounds fired vs. time | Graph | Time of each catastrophic kill graphed across total number of rounds fired |
| Shooting Effectiveness | Pie | Summation of each shot fired Summation of each catastrophic kill |

The formatted data can be distributed by floppy disk by having the user select that option, or it can be linked in to the local web-site by the web master for wider distribution.

FIGS. 14 through 23 illustrate exemplary types of statistical data, presented in graphical form, which are available in an After Action Review package. The graphical presentations of FIGS. 14 through 23 are illustrative and are not limitations of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A system for interaction with a plurality of simulators comprising:
  a processor;
  a bidirectional communication system, coupled to the processor and adapted to be coupled to two or more independent simulators, for transferring information from the processor to at least one of the simulators for affecting an on-going simulation and for transferring information from the one simulator to the processor wherein the processor includes circuitry for enabling a user to generate a proposed exercise by graphically adding portions of a proposed simulation on a display, and to graphically produce at the display simulation affecting events and including further circuitry for transferring at least one of the events to one or more of the simulators and wherein the processor includes circuitry for receiving information from one or more of the simulators indicative of the status of an ongoing simulation at the one simulator.

2. A system as in claim 1 which includes a storage unit coupled to the processor wherein the processor further includes circuitry for receiving simulation defining information from the one simulator and for storing at least in part, that defining information in the storage unit.

3. A system as in claim 2 which includes a write unit, coupled to the processor, for receipt of a writable medium and wherein the processor includes circuitry for transferring to the writable medium a representation of the defining information for subsequent replay of the simulation represented by the defining information.

4. A system as in claim 3 wherein the writable medium is removably received in the write unit and wherein the system includes a reply processor which has a display and a read unit wherein the read unit receives a medium to read the defining information therefrom.

5. A system as in claim 1 wherein the processor includes circuitry for storing a training exercise wherein the exercise incorporates features responsive to inputs from a trainer.

6. A system as in claim 5 wherein the processor includes circuitry for transmitting the exercise to the simulators.

7. A system as in claim 6 wherein the processor includes circuitry for monitoring an on-going exercise being carried out at various of the simulators.

8. A system as in claim 7 wherein the processor includes circuitry for injecting an event into an on-going exercise in response to inputs from the trainer.

9. A system as in claim 8 wherein the processor is programmable.

10. A system as in claim 5 wherein the processor includes circuitry for acquiring information from selected ones of the simulators and for storing that information.

11. A system as in claim 10 wherein the processor includes circuitry for editing the stored information subsequent to completion of the exercise thereby generating an edited output file.

12. A system as in claim 11 wherein the processor includes circuitry for transmitting a copy of the edited output file to a displaced location whereat the edited filed can be reviewed.

13. A system as in claim 1 wherein the simulators are dissimilar.

14. A system for interaction with a plurality of dissimilar simulators comprising:

a processor;

a bidirectional communication system, coupled to the processor and adapted to be coupled to the simulators, for transferring information from the processor to at least two independent simulators for affecting on-going simulations and for transferring information from at least one simulator to the processor wherein the processor includes circuitry for producing simulation affecting events and including further circuitry for transferring at least one of the events to the one simulator and wherein the processor includes circuitry for receiving information from the one simulator indicative of the status of an ongoing simulation at the one simulator;

wherein at least some of the simulators contain three dimensional-like simulation displays, and wherein a separate command display is coupled to the processor and wherein the processor includes circuitry for presenting to the command display a representation of at least a part of a simulation display simultaneously present at the one simulator.

15. A system for interaction with a plurality of simulators comprising:

a processor;

a bidirectional communication system, coupled to the processor and adapted to be coupled to the simulators, for transferring information from the processor to at least one of the simulators for affecting an on-going simulation and for transferring information from the one simulator to the processor wherein the processor includes circuitry for producing simulation affecting events and including further circuitry for transferring at least one of the events to the one simulator and wherein the processor includes circuitry for receiving information from the simulators indicative of the status of an ongoing simulation;

including an output device, coupled to the processor for generating reports indicative of the simulations carried out by at least a selected plurality of the simulators.

16. A system for creating and conducting a substantially real-time training exercise comprising:

a plurality of dissimilar simulators;

a bidirectional communication link coupled to the simulators;

a trainer's control unit having a display coupled to the link wherein the unit includes circuitry for creating a training exercise at least in part in response to a trainer graphically overlaying one or more platform movements on an image of a portion of the exercise; and circuitry coupled to at least the control unit, for transmitting the exercise to the simulators for parallel execution of the exercise.

17. A system for creating and conducting a substantially real-time training exercise comprising:

a plurality of simulators;

a bidirectional communication link coupled to the simulators;

a trainer's control unit having a display coupled to the link wherein the unit includes circuitry for creating a training exercise in response to inputs from a trainer; and circuitry coupled to at least the control unit, for transmitting the exercise to the simulators for parallel execution of the exercise;

which includes trainer input circuitry and a graphical user interface coupled to the control unit for previewing and for graphically editing the created exercise.

18. A method of managing a multi-person training exercise comprising:

providing a plurality of separate exercise simulators wherein some of the simulators are different from others in the plurality wherein each of the simulators can communicate with a displaced exercise manager by a common, predetermined communications protocol;

generating an electronic, simulator readable, representation of the exercise and transmitting that representation to at least some of the simulators using the common protocol;

initiating the exercise in at least some of the simulators;

electronically monitoring the exercise as it is being carried out in at least some of the simulators; and automatically collecting and storing information during the exercise from at least some of the simulators wherein the collected information is indicative of performance of the respective simulator during the exercise.

19. A method as in claim 18 which includes:

preparing a post-exercise machine readable, review file of the exercise.

20. A method as in claim 19 which includes disseminating at least one copy of the review file for examination subsequent to completion of the exercise.

21. A method as in claim 18 which includes reviewing the exercise before it is transmitted to the simulators.

22. A manager for managing simulations being presented on a plurality of independent simulation units wherein each of the units includes a standardized interface for coupling to a common bidirectional communications network, the manager comprising:

a bidirectional communications interface for transmitting simulation related information to and receiving simulation related information from the network;

a trainer's display unit;

a processor, coupled to the interface and the display unit, instructions executable by the processor wherein a simulation scenario can be created by a trainer drawing platform paths and viewed, at least in part, on the trainer's display; and additional instructions for automatically creating messages for at least some of the simulation units and for transmitting the messages, using a common predetermined protocol, to the simulation units via the network, for carrying out the scenario at the respective simulation units.

23. A manager as in claim 22 which includes instructions for injecting a selected platform into the scenario being carried out at a selected unit wherein the platform is an addition to the scenario.

24. A manager as in claim 23 wherein at least some of the simulators are different from others in the plurality.

25. A manager for managing simulations being presented on a plurality of independent simulation units wherein each of the units includes a standardized interface for coupling to a common bidirectional communications network, the manager comprising:

a bidirectional communications interface for transmitting simulation related information to and receiving simulation related information from the network, a trainer's display unit;

a processor, coupled to the interface and the display unit, instructions executable by the processor wherein a simulation scenario can be created and viewed, at least in part, on the trainer's display, and additional instructions for automatically creating messages for at least some of the simulation units and for transmitting the messages, using a common predetermined protocol, to the simulation units via the network, for carrying out the scenario at the respective simulation units; and which includes a simulation recording unit, for recording, at a common location, simulation activities related to the scenario at the plurality of simulation units for subsequent review.

26. A manager for managing simulations being presented on a plurality of independent simulation units wherein each of the units includes a standardized interface for coupling to a common bidirectional communications network, the manager comprising:

a bidirectional communications interface for transmitting simulation related information to and receiving simulation related information from the network;

a trainer's display unit;

a processor, coupled to the interface and the display unit, instructions executable by the processor wherein a simulation scenario can be created and viewed, at least in part, on the trainer's display; and additional instructions for automatically creating messages for at least some of the simulation units and for transmitting the messages, using a common predetermined protocol to the simulation units via the network, for carrying out the scenario at the respective simulation units; and which includes report generation instructions for providing reports and analysis pertaining to the managed simulations.

27. A process for developing and carrying out an exercise involving dissimilar simulators comprising:

defining platform movements relative to a terrain for a common exercise to be carried out at the dissimilar simulators using a graphical user interface which enables a manager to create and to simultaneously display multiple platform movements relative to the terrain at a display providing an animated preview of the exercise at the display;

converting the exercise to a predetermined common format and storing same;

broadcasting the stored exercise, in the common format, to the dissimilar simulators to carry out the exercise;

receiving the broadcast exercise at at least two different simulators, and, extracting information at each respective simulator, directed to that type of simulator to carry out a respective simulation process thereat; and providing one of hard copy and electronic reports with analysis of the results of the exercise.

28. A process as in claim 27 which includes introducing, under the control of a trainer, at least one animated vehicle, not part of the stored exercise, at a selected simulator during the exercise.

29. A process as in claim 27 which includes modifying the sequence of the stored exercise while that exercise is being broadcast to the simulators.

30. A process as in claim 27 which includes storing information as to the simulation processes carried out at the respective simulators during the exercise.

31. A process as in claim 30 wherein the storing takes place at a common data base.

32. A process as in claim 31 which includes replaying at a selected display the stored simulations form the dissimilar simulators.

33. A process as in claim 27 which includes presenting at the manager display an image corresponding to the image then present at a selected one of the simulators.

34. An exercise manager comprising:
- a programmed processor;
- a trainer's display unit coupled to the processor;
- executable instructions, coupled to the processor, for visually presenting selected geography so that the trainer can at least in part, graphically overlay exercise information on that geography for presentation to multiple simulators;
- executable instructions for previewing the exercise on the display unit;
- executable instructions for broadcasting the exercise to a plurality of simulators for visual presentation to respective operators;
- executable instructions for enabling the trainer to inject one or more platforms onto a visual presentation at a selected simulator in real-time, exclusive of the defined exercise;
- executable instructions for presenting on the trainer's display a real-time representation of the visual presentation at a selected simulator.

35. A manager as in claim 34 which includes instructions for storing at least selected aspects of the exercise as executed for subsequent analysis.

36. A manager as in claim 35 which includes instructions for generating reports of the exercise as executed.

* * * * *

UNITED STATES PATENT AND TRADEMARK OFFICE
CERTIFICATE OF CORRECTION

PATENT NO. : 6,106,297
DATED : August 22, 2000
INVENTOR(S) : Eyton Pollak, Sandra Vaquerizo It is certified that error appears in the above-identified patent and that said Letters Patent is hereby corrected as shown below:

Title page,
Line 4, after "Inventors:," change "Eyton" to "Eytan."

Title page,
Under References Cited, U.S. Patent Documents, the following patents were omitted:

| | | |
|---|---|---|
| 5,228,854 | 7/1993 | Eldridge |
| 5,292,254 | 3/1994 | Miller et al. |
| 5,378,155 | 1/1995 | Eldridge |
| 5,571,018 | 11/1996 | FitzGerald |
| 5,556,281 | 9/1996 | FitzGerald et al. |
| 5,591,031 | 1/1997 | Monk et al. |
| 5,690,491 | 11/1997 | FitzGerald et al. |
| 5,781,437 | 7/1993 | Wiemer et al. |

Column 4,
Line 50, please change "is", first occurrence, to -- in --.

Column 5,
Line 2, please delete "and".

UNITED STATES PATENT AND TRADEMARK OFFICE
CERTIFICATE OF CORRECTION

PATENT NO. : 6,106,297
DATED : August 22, 2000
INVENTOR(S) : Eyton Pollak, Sandra Vaquerizo It is certified that error appears in the above-identified patent and that said Letters Patent is hereby corrected as shown below:

Column 8,
Line 7, please delete "even" and insert -- event --.
Line 10, after "system, please insert -- 20 --.
Line 45, please delete "a".
Line 48, please delete "formal" and insert -- form --.

Column 9,
Line 32, please insert a "." after the ")" and start a new paragraph with "PDUs".

Column 11,
Line 51, please delete "filed" and insert -- file --.

Signed and Sealed this

Twenty-first Day of August, 2001

*Attest:*

*Nicholas P. Godici*

*Attesting Officer*

NICHOLAS P. GODICI
*Acting Director of the United States Patent and Trademark Office*